United States Patent
Pozivil et al.

(10) Patent No.: US 8,421,258 B2
(45) Date of Patent: Apr. 16, 2013

(54) POWER RECOVERY MACHINE

(75) Inventors: Josef Pozivil, Allschwil (CH);
Jean-Louis Galelli, Wittelsheim (FR);
Patrice Pflieger, Mulhouse (FR)

(73) Assignee: Cryostar SAS (FR)

( * ) Notice: Subject to any disclaimer, the term of this patent is extended or adjusted under 35 U.S.C. 154(b) by 637 days.

(21) Appl. No.: 12/440,627

(22) PCT Filed: Sep. 10, 2007

(86) PCT No.: PCT/IB2007/003482
§ 371 (c)(1),
(2), (4) Date: Sep. 11, 2009

(87) PCT Pub. No.: WO2008/032215
PCT Pub. Date: Mar. 20, 2008

(65) Prior Publication Data
US 2010/0237619 A1  Sep. 23, 2010

(30) Foreign Application Priority Data

Sep. 12, 2006  (EP) .................................... 06352014

(51) Int. Cl.
| | |
|---|---|
| *F01D 15/10* | (2006.01) |
| *F02C 6/00* | (2006.01) |
| *H02K 7/18* | (2006.01) |
| *H02P 9/04* | (2006.01) |
| *F02B 63/04* | (2006.01) |

(52) U.S. Cl.
USPC ............................. 290/52; 290/1 A; 60/39.511

(58) Field of Classification Search .................. 290/1 A, 290/53, 52; 60/39.511
See application file for complete search history.

(56) References Cited

U.S. PATENT DOCUMENTS

| | | | | |
|---|---|---|---|---|
| 2,917,636 | A | | 12/1959 | Akeley ............................ 290/52 |
| 3,905,197 | A | * | 9/1975 | Miller ............................. 60/646 |
| 4,170,435 | A | | 10/1979 | Swearingen ..................... 415/1 |
| 4,253,031 | A | * | 2/1981 | Frister ............................ 290/52 |
| 4,301,375 | A | * | 11/1981 | Anderson ..................... 290/1 R |
| 4,362,020 | A | * | 12/1982 | Meacher et al. ............... 60/657 |
| 4,507,914 | A | * | 4/1985 | Rice ............................ 60/39.17 |
| 4,550,562 | A | * | 11/1985 | Rice ............................. 60/772 |
| 4,555,637 | A | | 11/1985 | Irvine ........................... 290/52 |

(Continued)

FOREIGN PATENT DOCUMENTS

| | | |
|---|---|---|
| CA | 2 461 086 A1 | 9/2005 |
| EP | 1 905 948 A1 | 4/2008 |
| JP | 63277443 A | 11/1988 |
| WO | WO 98/57046 | 12/1998 |

OTHER PUBLICATIONS w/Inter. Search Report, Feb. 6, 2008.

*Primary Examiner* — Pedro J Cuevas
(74) *Attorney, Agent, or Firm* — Joshua L. Cohen

(57) ABSTRACT

A machine for recovering power from a flow of compressed gas, for example, natural gas includes a turbo-expander having a turbo-expander wheel, and a generator having a rotor able to be driven by the turbo-expander wheel and a stator about the rotor. The turbo-expander and the generator are housed in a length of pipe. The turbo-expander wheel has an obverse side facing the generator. There is a flow passage for the flow of expanded gas that places the obverse side of the wheel in gas flow communication with an outer surface of the stator. This outer surface typically carries fins to facilitate cooling of the stator by expanded gas from the turbo-expander.

15 Claims, 2 Drawing Sheets

U.S. PATENT DOCUMENTS

| | | | | |
|---|---|---|---|---|
| 4,740,711 | A | | 4/1988 | Sato et al. .................... 290/52 |
| 5,220,232 | A | | 6/1993 | Rigney, II et al. ............ 310/90.5 |
| 5,481,145 | A | | 1/1996 | Canders et al. ............. 310/90.5 |
| 5,497,615 | A | * | 3/1996 | Noe et al. ................... 60/39.511 |
| 5,505,587 | A | * | 4/1996 | Ghetzler ........................ 415/49 |
| 5,593,274 | A | * | 1/1997 | Carreno et al. ............. 415/115 |
| 5,659,205 | A | * | 8/1997 | Weisser ........................ 290/52 |
| 5,685,693 | A | * | 11/1997 | Sexton et al. .............. 415/173.1 |
| 5,779,442 | A | * | 7/1998 | Sexton et al. .............. 415/173.2 |
| 5,789,825 | A | * | 8/1998 | Selfors et al. ................. 290/52 |
| 5,831,341 | A | * | 11/1998 | Selfors et al. ................. 290/52 |
| 5,893,423 | A | * | 4/1999 | Selfors et al. ............. 180/65.245 |
| 5,906,473 | A | * | 5/1999 | Sexton et al. .............. 415/173.2 |
| 5,913,658 | A | * | 6/1999 | Sexton et al. ................ 415/201 |
| 6,270,309 | B1 | * | 8/2001 | Ghetzler et al. ................ 415/35 |
| 6,294,842 | B1 | * | 9/2001 | Skowronski ..................... 290/7 |
| 6,439,836 | B1 | * | 8/2002 | Pozivil ........................ 415/110 |
| 7,040,082 | B2 | | 5/2006 | Bouiller et al. ............ 60/39.183 |
| 7,521,815 | B2 | * | 4/2009 | Lee et al. ....................... 290/52 |
| 7,535,150 | B1 | * | 5/2009 | Wilson ......................... 310/166 |
| 7,638,892 | B2 | | 12/2009 | Myers ........................... 290/52 |
| 7,723,857 | B2 | * | 5/2010 | Chen et al. ................... 290/1 A |
| 7,948,105 | B2 | * | 5/2011 | Agrawal et al. ............... 290/52 |
| 8,192,688 | B2 | * | 6/2012 | Hagen et al. ................. 422/129 |
| 8,368,242 | B2 | * | 2/2013 | Holstein et al. ................ 290/54 |
| 2008/0252077 | A1 | * | 10/2008 | Myers ........................... 290/52 |
| 2012/0256502 | A1 | * | 10/2012 | Le Besnerais ................ 310/54 |
| 2013/0015667 | A1 | * | 1/2013 | Fullerton et al. ............. 290/1 A |

* cited by examiner

POWER RECOVERY MACHINE

This invention relates to a machine for recovering power from a compressed gas, which machine is housed in a length of pipe that typically forms part of a pipeline.

It is well known of course to pass gas at high pressure along a pipeline in order to pass the gas from a point of collection or production to a distribution network. Modern natural gas transmission pipelines can extend for hundreds or thousands of miles. A typical natural gas distribution system has a length of pipeline operating at pressures between 50 and 100 bars and a length of pipeline operating at much lower pressures, typically between 5 and 10 bars, the latter communicating with a local distribution network operating at a pressure a little above 1 bar. There is therefore a need to provide stations at which the pressure can be reduced from a higher to a lower level.

The pressure reduction can simply be achieved by passing the compressed gas through a suitable arrangement of pressure-reduction valves. As the pressure of the gas is reduced, so it expands and falls in temperature. If the gas contains water vapour, the drop in temperature could lead to the formation of hydrates and hydrocarbon liquids that would damage the valves. It is therefore the practice to preheat the compressed gas upstream of its expansion.

A substantial disadvantage of the use of pressure reduction (or expansion) valves is that work of raising the gas to the high pressure is entirely lost. An alternative form of pressure reduction station is well known which overcomes this disadvantage. The alternative form of pressure reduction station employs a turbo-expander to reduce the pressure of the gas. The rotation of the turbo-expander is employed to perform useful work. One example of such an arrangement is described in Canadian Patent Application No. 2 461 086A (CA-A-2 461 086). According to CA-A-2 461 086 natural gas entering a pressure control station is channelled into a turbine which is powered by expansion of the natural gas as the pressure of the natural gas is reduced. The power output of the turbine is captured for useful purposes, typically by being used to drive an electrical generator.

Machines combining a turbo-expander with an electrical generator are known. An example of such a machine is disclosed in U.S. Pat. No. 5,481,145 (U.S. Pat. No. 5,481,145) and its use in a long distance pipeline for gas is mentioned. The machine comprises an expansion turbine having a radially outer inlet passage, a central outlet passage, a turbine wheel driven by the gas when flowing from the inlet passage to the outlet passage, and an electrical generator having a rotor driven by the turbine wheel. The turbine wheel has an obverse side or face which includes an array of blades having a configuration that causes the gas to undergo expansion. The rotor and the turbine wheel are supported by magnetic bearings. The obverse side of the turbine wheel faces away from the generator and most of the expanded gas is discharged from the machine at the same end at which it enters. However, some of the expanded gas leaks pas a labyrinthine seal and is used to provide cooling to a magnetic bearing and the space between the rotor and the stator of the electrical generator.

The machine disclosed in U.S. Pat. No. 5,481,145 generates in operation and therefore needs to dissipate a considerable amount of heat, these needs being far greater than can be met by the small amount of exposure to gas that leaks from the turbine into the generator. External coolant is thus supplied to the outer surface of the stator of the electrical generator. In practice, improvements to the cooling arrangements are needed when the machine is employed to reduce the pressure of, say, natural gas flowing along a distribution pipeline, particularly if the natural gas is preheated upstream of its expansion.

According to the present invention there is provided a machine for recovering power from a flow of compressed gas, comprising, firstly, a turbo-expander having a turbo-expander wheel, and, secondly, a generator having a rotor and a stator, the rotor being able to be driven by the turbo-expander wheel and the turbo-expander and the rotor being housed in a length of pipe, wherein the obverse side of the turbo-expander wheel faces the generator and there is an unrestricted passage for the flow of expanded gas placing the obverse side of the turbo-expander wheel in gas flow communication with the outer surface of the stator.

The machine according to the invention is able in normal operation to effect cooling of the stator of the generator entirely by expansion of the compressed gas without recourse to a liquid coolant such as water.

The outer surface of the stator preferably has cooling fins. Such an arrangement facilitates cooling of the stator by the expanded gas.

There is typically at least one seal through which expanded gas is able to leak in order to effect cooling of the inner surface of the stator. The seal is typically a labyrinthine seal. In addition, the generator may have an inlet for gaseous coolant placing a space defined between the rotor and a stator associated therewith in gas flow communication with a further length of pipe upstream of the machine. Typically the inlet communicates with that further length of pipe upstream of any preheater therein.

The machine according to the invention may have associated with it a preheater for preheating the flow of compressed gas to be turbo-expanded. The preheater may be located in a further length of pipe upstream of the machine.

If the pressure reduction or step down required is greater than can readily be accomplished using a single turbo-expander wheel, a plurality of machines according to the invention may be arranged in line with one another. If desired, a preheater may be provided between the two machines. If further desired, a preheater may be provided upstream of the upstream machine. Alternatively, a machine according to the invention may comprise a single generator but a plurality of turbine wheels.

Typically, the rotor and the turbo-expander wheel are mounted on a shaft which is supported by a plurality of magnetic bearings, the magnetic bearings comprising separate radial and axial magnetic bearings. Other bearing arrangements may, however, be employed. For example, oil lubricated sleeve bearings, gas bearings or other forms of anti-friction bearings can be used instead of or in addition to the magnetic bearings.

The machine according to the invention preferably additionally includes means for balancing the pressure on the obverse and reverse sides of the turbo-expander wheel. In one example of such an arrangement the balancing means comprises a thrust chamber bounded on one side by the reverse side of the turbo-expander wheel, the thrust chamber being in gas flow communication with the tip of the turbo-expander wheel through a seal, typically a labyrinthine seal, the thrust chamber having an outlet conduit associated therewith, the outlet conduit having disposed therein a flow control valve able to be adjusted to balance the pressures on the obverse and reverse sides of the turbo-expander wheel. Typically the flow control valve is arranged to respond to signals from an axial thrust sensor in an axial magnetic bearing that supports the rotor.

The machine according to the invention will now be described by way of example with reference to the accompanying drawings, in which.

The drawings are not to scale.

Figure 1:
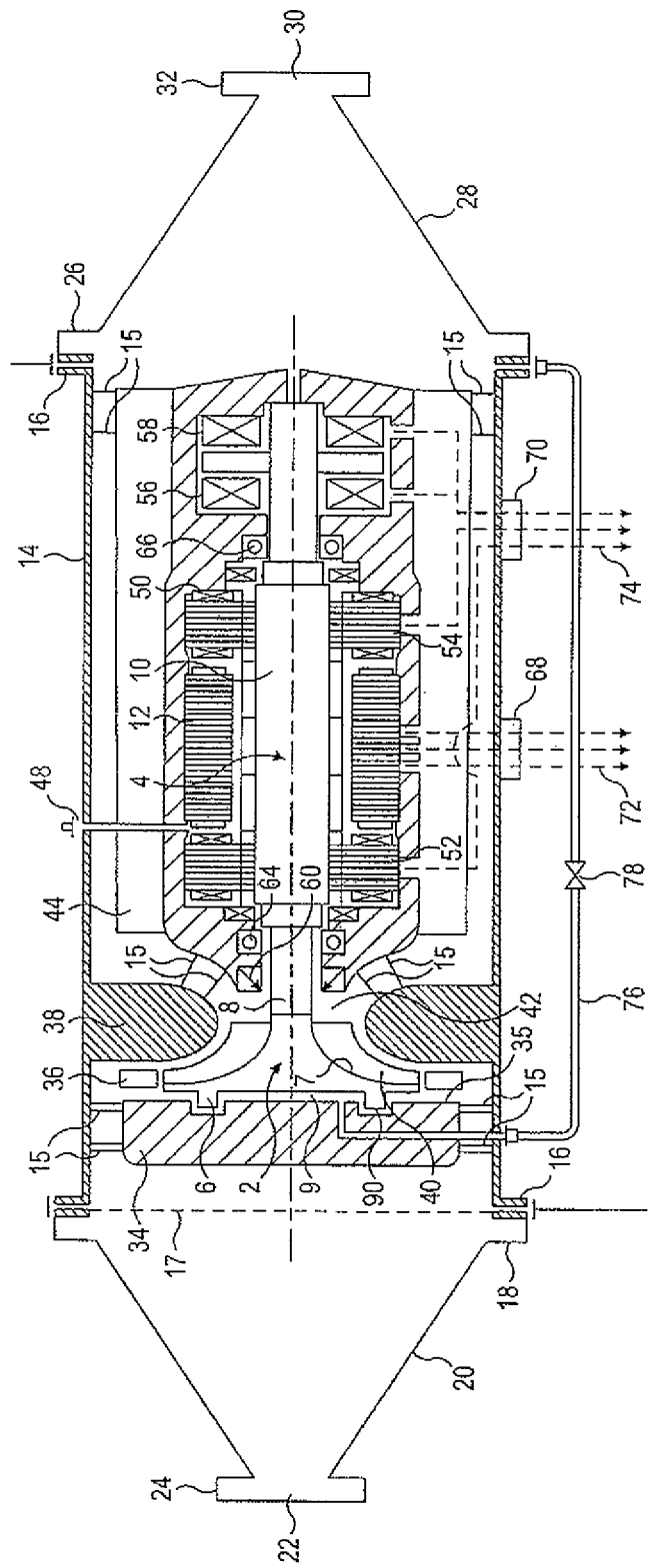
FIG. 1 is a schematic sectional side elevation of the machine.

Referring to FIG. 1 of the drawings, the machine shown therein comprises a turbo-expander 2 and an electrical generator 4. The turbo-expander 2 has a wheel 6. Rotation of the wheel 6 is, in operation, caused by expanding gas. The wheel 6 is mounted on an axial shaft 8. The shaft 8 also carries a rotor 10 forming part of the generator 4. The rotor 10 is located within a stator 12. In operation rotation of the wheel 6 by expanding gas drives the rotor 10 and results in the generation of electrical power.

The axial assembly of the turbo-expander 2 and the generator 4 is mounted within a housing 14 in the form of a length of pipe. Support ribs 15 are used for this purpose. The housing or pipe 14 is provided with flanges 16 at either end. To one flange 16 is coupled a complementary flange 18 of a generally frusto-conical inlet duct 20 having an axial inlet 22 which is provided with a flange 24 to which can be coupled a first pipeline (not shown) for distributing pressurised gas, typically natural gas. To the other flange 16 of the pipe 14 is coupled a complementary flange 26 of a generally frusto-conical outlet duct 28. A protective screen 17 is provided between the flanges 17 and 18. The outlet duct 28 has an axial outlet 30 which is provided with a flange 32 to which can be coupled a second pipeline (not shown) for distributing pressurised gas. Accordingly gas at a first elevated pressure is able to flow from the first pipeline through the turbo-expander 2 and enter the second pipeline at a second elevated pressure lower than the first.

The turbo-expander wheel 6 has a radial inflow. The wheel 6 is mounted so that its obverse side 7 faces the generator 4 while its reverse side 9 faces away from the generator 4. It is the obverse side that has integral therewith blades 40 of a conventional configuration. Gas flowing from the inlet duct 20 passes through inlet guide vanes 36 whose position is automatically adjustable in accordance with the flow rate therethrough. An appropriate adjusting mechanism of a kind well known in the turbo-expander art is housed within supports 38 which are secured to the inner wall of the pipe 14.

The compressed gas expands as it passes over the blades 40 and drives the turbine wheel 6. When the turbine wheel 6 is driven, the entire assembly of the shaft 8 and rotor 10 is caused to rotate about the axis of rotation at the same speed as the wheel 6.

The expanded gas flows into an outlet passage 42 extending from the obverse side 7 of the wheel 6 to the near end of the stator 12 and over the outer surface of the stator 12. The gas is reduced in temperature as a result of its expansion. For example, it might enter at a temperature in the range of 70 to 90° C. and be cooled to a temperature in the range of 5 to 10° C. The inlet temperature is desirably high enough to ensure that the temperature on expansion does not fall to a level at which any moisture in the gas is likely to form a hydrate with the gas or any hydrocarbon condenses. Because the gas is now typically at a temperature in the range of 5 to 10° C., it can perform a useful cooling function for the generator. The gas in flowing over the external surface of the stator 12 extracts heat from it. In order to facilitate the extraction of the heat the outer surface of the stator 12 is formed with an array of axially extending fins 44. The gas flows over the fins 44 in a generally axial direction and passes into the outlet duct 28. From there it passes to the second pipeline (not shown) at a chosen pressure, substantially less than the pressure at which it is received from the first pipeline (not shown).

In addition to the cooling of the outer surface of the stator 12 provided by the expanded gas, gaseous coolant leaks from the passage 42 through a labyrinthine or other seal 60 between the rotor 10 and the stator 12 and provides cooling for the inner surface of the stator 12. The rate of leakage through the seal 60 is generally adequate for this cooling purpose, but in a typical arrangement a feed passage 48 for the emergency provision of further gaseous coolant extends from outside the machine through the wall of the pipe 14 and the wall of the stator 12 to enable this coolant to be provided to the space between the rotor 10 and the stator 12. In a typical arrangement of the generator 4, it is of a permanently excited synchronous kind, in which the rotor 10 is electrically passive and comprises high energy permanent magnets seated on the shaft 8 and arranged in segments. The stator 12 thus houses all the windings 50 of the generator 4. In operation, these windings evolve heat. The flow of gaseous coolant around the windings helps to remove heat.

The assembly of the turbo-expander wheel 6, the shaft 8 and the rotor 10 is supported by means of active magnetic bearing units 52, 54, 56 and 58 which are housed within the stator 12. The magnetic bearings 52, 54, 56 and 58 ensure that there is no contact between the shaft 8 and the rotor 10, on the one hand, and the stator 12 in normal operation of the generator 4. Bearing units 52 and 54 are located one on each side of the windings 50 of the generator 4. Both bearing units 52 and 54 are active radial magnetic bearings. Their structure and configuration are similar to the corresponding bearings described and illustrated in U.S. Pat. No. 5,481,145 and are of a kind well known in the art. Their structure, configuration and operation will not be described further below. It should be noted, however, that unlike the corresponding bearings in the turbine-generator unit described and illustrated in U.S. Pat. No. 5,481,145, the bearing units 52 and 54 do not contain any axial bearing elements. Instead the separate bearing units 56 and 58 are active axial magnetic bearings. These units are located at the downstream end of the stator 12. The active axial magnetic bearings 56 and 58 are of a kind well known in the art, so their structure, configuration and operation will not be described further herein.

The magnetic bearing units 52, 54, 56 and 58 all include electrical coils and windings which in operation generate heat. The cooling gas which is employed to cool the inner surface of the stator 12 (and its windings 50) provides cooling also for the magnetic bearing units 52, 54, 56 and 58.

Because the gas that cools the inner surface of the stator 12 typically consists of gas derived from the incoming flow of compressed gas there is generally no need to have a corresponding sealing arrangement at the downstream end of the stator 12. If, however, this inner surface cooling gas were chosen to be of a different composition from the flow of compressed gas to be expanded, and if it were desired to minimise mixing of the two gases, a similar seal (not shown) to the seal 60 would be provided at the downstream end of the stator 12 and extraction conduits (not shown) similar to the feed passage 48 would be provided at both ends of the stator 12 for the discharge of the inner surface cooling gas.

The assembly of the turbo-expander wheel 6, the shaft 8 and rotor 10 is also provided with mechanical bearings in the form of ball bearing units 64 and 66 toward each end of the stator 12. The ball bearing units 64 and 66 may be of conventional type and will support the assembly in the event of failure of the electrical power supply to the magnetic bearings 52, 54, 56 and 58 or when these magnetic bearings are not energised. The ball bearing units 64 and 66 are of a conventional kind, so their structure, configuration and operation need not be described further herein.

The machine shown in FIG. 1 of the accompanying drawings also includes bushes 68 and 70 leading through the wall of the pipe 14 through which electrical power lines 72 from the generator 4 and electrical power and control signal lines 74 to the magnetic bearings 52, 54, 56 and 58 can respectively be led.

The machine shown in FIG. 1 is provided with a thrust chamber 34 to control and balance the forces of axial thrust acting on the turbo-expander wheel. The thrust chamber is bounded at one end by the reverse side 9 of the turbo-expander wheel 6 and at its other end by a separate chamber wall 35. On the reverse side 9 of the wheel 6 there is a staggered arrangement of cylindrical rings which are engaged with a complementary staggered labyrinthine ring assembled into the wall 35. The arrangement is shown schematically in FIG. 1, being indicated by the reference numeral 90. In the absence of the thrust chamber 34 and the labyrinthine seal arrangement 90, the pressure acting on the reverse side 9 of the turbo-expander wheel 6 would approximate to the pressure at the tip of the wheel 6. Because on the obverse side 7 the gas is expanding there is a net axial thrust towards the generator 4. The arrangement of the thrust chamber 34 enables the axial thrust to be essentially limited. The pressure drop across the labyrinthine seal arrangement 90 serves to reduce the thrust. It is eliminated altogether by means of a thrust balancing conduit 76 which places the thrust chamber 34 in gas flow communication with a region of the outlet duct 28. There is a flow control valve 78 in the conduit 76. The position of the valve 78 is able to be set so as to ensure that the pressures acting on the reverse side 9 of the turbo-expander wheel 6 balances that acting on the obverse side 7. Adjustment of the setting of the control valve 78 may be performed automatically in response to signals indicative of the axial thrust experienced by one or both of the axial thrust bearing 56 and 58. Instead of the conduit 76 and the valve 78, the turbo-expander wheel can be provided with a plurality of balancing orifices (not shown).

Figure 2:
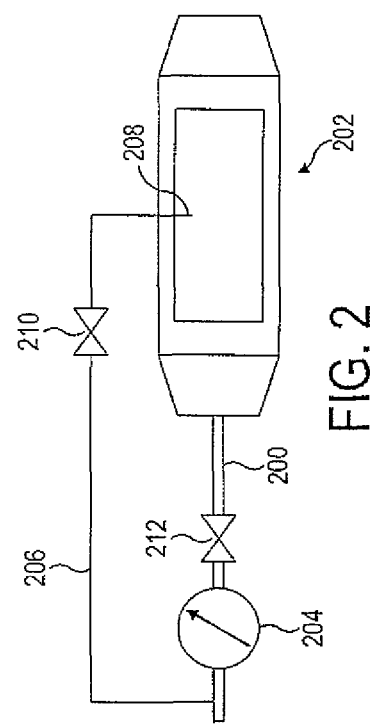
FIG. 2 is a flow diagram ancillary equipment for the machine shown in FIG. 1.

Referring now to FIG. 2 of the drawings, a pipeline 200 upstream of a machine 202 identical to the machine 1 has a preheater 204 located therein. the preheater 204 may be of any kind of indirect heat exchanger capable of raising the compressed gas stream to a temperature between 50 and 100° C. Typically, the preheater 204 may include an array of heating coils through which hot water or steam may be circulated. From a region of the pipeline 200 upstream of the preheater 204, a conduit 206 conducts cold pressurised gas to an inlet passage 208 for coolant which is identical to the feed passage 48 for additional coolant in the machine 1 shown in FIG. 1 of the drawings. A flow control valve 210 is located in the conduit 206 and its setting may be selected so as to allow coolant to flow into the passage 208 at a chosen minimal rate.

In the event of an emergency a fast-closing shut off valve 212 is provided in a region of the pipeline 202 between the preheater 204 and the machine 200.

Figure 3:
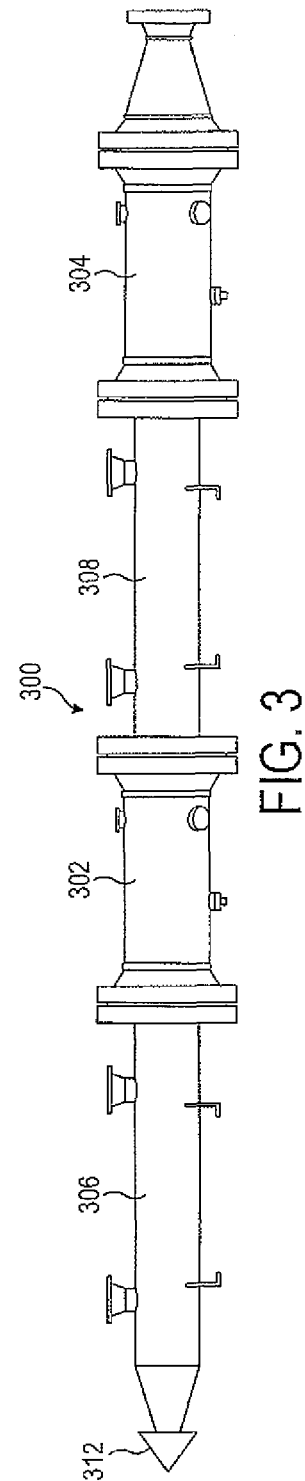
FIG. 3 is a schematic side view of a plant comprising two machines of the kind shown in FIGS. 1 and 2.

Referring now to FIG. 3 of the drawings, there is shown a pipeline 300 which is fitted with two machines 302 and 304 according to the invention, the machines 302 and 304 being arranged in line. Upstream of each of the machines 302 and 304 there are sections of pipe 306 and 308, respectively, which may each house a preheater of the kind described with reference to FIG. 2. A fast-closing shut-off valve 312 is now provided upstream of the first preheater 306. The arrangement shown in FIG. 3 may be employed if a particularly large ratio of inlet to outlet pressure, that is a particularly large pressure step down is required.

The invention claimed is:

1. A machine for recovering power from a flow of a compressed gas, comprising:
   a turbo-expander comprising a turbo-expander wheel with a radial inflow and an obverse side,
   a generator comprising a rotor and a stator, the rotor being able to be driven by the turbo-expander wheel, and the stator comprising a plurality of cooling fins disposed at an outer surface of the stator, wherein the obverse side of the turbo-expander wheel faces the generator,
   an unrestricted passage for the flow of expanded gas, the unrestricted passage disposed for placing the obverse side of the turbo-expander wheel in gas flow communication with an outer surface of the stator, and
   a length of pipe in which the machine is housed.

2. A machine according to claim 1, wherein the obverse side of the turbo-expander wheel is in gas flow communication through a seal with a gas space defined between the rotor and an inner surface of the stator.

3. A machine according to claim 2, wherein the seal is a labyrinthine seal.

4. A machine according to claim 1, wherein the rotor and the turbo-expander wheel are mounted on a shaft supported by a plurality of magnetic bearings, the magnetic bearings comprising separate radial and axial magnetic bearings.

5. A machine according to claim 1, further comprising means for balancing pressures on the obverse and reverse sides of the turbo-expander wheel.

6. A machine according to claim 5, wherein the balancing means comprises a thrust chamber bounded on one side by the reverse side of the turbo-expander wheel, the thrust chamber being in gas flow communication with a tip of the turbo-expander wheel through a seal, the thrust chamber having an outlet conduit associated therewith, the outlet conduit having disposed therein a flow control valve able to be adjusted to balance the pressures on the obverse and reverse sides of the turbo-expander wheel.

7. A machine according to claim 6, wherein the flow control valve is arranged to respond to signals from an axial thrust sensor in an axial magnetic bearing that supports the rotor.

8. A machine according to claim 1, further comprising a preheater for preheating the flow of compressed gas to be turbo-expanded.

9. A machine according to claim 8, wherein the preheater is located in a further length of pipe positioned upstream of the machine.

10. A machine according to claim 1, wherein the generator comprises an inlet for additional gaseous coolant placing a space defined between the rotor and the stator in gas flow communication with the further length of pipe positioned upstream of the length of pipe.

11. A machine according to claim 10, further comprising a preheater for preheating the flow of compressed gas to be turbo-expanded, wherein the further length of pipe with which said inlet for additional gaseous coolant communicates also contains the preheater.

12. A machine according to claim 11, wherein said inlet for additional gaseous coolant is in communication with a region of the further length of pipe upstream of the preheater.

13. A machine according to claim 1, further comprising at least one additional turbo-expander wheel.

14. A plurality of the machines according to claim 1, wherein said plurality of machines are arranged in line.

15. A natural gas distribution pipeline, comprising the machine according to claim 1.

* * * * *